US009504937B2

(12) United States Patent
Pollack

(10) Patent No.: US 9,504,937 B2
(45) Date of Patent: *Nov. 29, 2016

(54) METHODS FOR COLLECTION FRACTIONS OF MIXTURES, SUSPENSIONS, AND SOLUTIONS OF NON-POLAR LIQUIDS

(71) Applicant: 4th-Phase, Inc., Seattle, WA (US)

(72) Inventor: Gerald H. Pollack, Seattle, WA (US)

(73) Assignee: 4th-Phase, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,973

(22) Filed: Dec. 30, 2015

(65) Prior Publication Data

US 2016/0114263 A1 Apr. 28, 2016

Related U.S. Application Data

(60) Division of application No. 12/911,399, filed on Oct. 25, 2010, now Pat. No. 9,255,015, which is a continuation-in-part of application No. 12/363,189, filed on Jan. 30, 2009, now Pat. No. 7,819,259, which is a continuation-in-part of application No. 11/623,719, filed on Jan. 16, 2007, now Pat. No. 7,793,788.

(60) Provisional application No. 60/743,135, filed on Jan. 17, 2006.

(51) Int. Cl.
| B01D 15/08 | (2006.01) |
| B01D 61/00 | (2006.01) |
| B01D 17/04 | (2006.01) |
| C02F 1/26 | (2006.01) |
| C02F 1/44 | (2006.01) |

(Continued)

(52) U.S. Cl.
CPC .............. B01D 17/045 (2013.01); C02F 1/26 (2013.01); C02F 1/28 (2013.01); C02F 1/44 (2013.01); C02F 2101/32 (2013.01); C02F 2103/002 (2013.01); C02F 2103/005 (2013.01); C02F 2103/08 (2013.01); C02F 2209/003 (2013.01); C02F 2301/08 (2013.01); C02F 2303/04 (2013.01)

(58) Field of Classification Search
CPC ........... C02F 1/46; B01D 3/00; B01D 61/00; B01D 15/08

See application file for complete search history.

(56) References Cited

U.S. PATENT DOCUMENTS

| 4,820,343 A | 4/1989 | Ostertag |
| 4,955,503 A | 9/1990 | Propes |

(Continued)

FOREIGN PATENT DOCUMENTS

| WO | WO 03/097469 | 11/2003 |

OTHER PUBLICATIONS

Zheng et al., "Long-range forces extending from polymer-gel surfaces", Physical Review E 68, 031408 (2003), received May 7, 2003. Sep. 29, 2003.

(Continued)

*Primary Examiner* — Walter D Griffin
*Assistant Examiner* — Cameron J Allen
(74) *Attorney, Agent, or Firm* — Mintz Levin Cohn Ferris Glovsky and Popeo, P.C.

(57) ABSTRACT

A polar liquid mixture containing suspended or dissolved particles or solute is exposed to air or a hydrophilic surface. An exclusion zone having a reduced concentration of particles or solute is formed in the polar liquid adjacent to the interface with air or the hydrophilic surface. One or more fractions of purified polar liquid and/or concentrated particles or solute are collected. A sensor can provide feedback to the collector.

16 Claims, 16 Drawing Sheets

(51) Int. Cl.
*C02F 1/28* (2006.01)
*C02F 103/00* (2006.01)
*C02F 103/08* (2006.01)
*C02F 101/32* (2006.01)

(56) References Cited

U.S. PATENT DOCUMENTS

| | | | |
|---|---|---|---|
| 5,934,501 A | 8/1999 | Wright et al. | |
| 7,793,788 B2 * | 9/2010 | Pollack | C02F 1/44 210/511 |
| 7,819,259 B2 | 10/2010 | Pollack | |
| 2001/0035417 A1 | 11/2001 | Kantor et al. | |
| 2001/0042712 A1 | 11/2001 | Battrell et al. | |
| 2001/0051788 A1 | 12/2001 | Paukovits et al. | |
| 2002/0017495 A1 | 2/2002 | Iizuka et al. | |
| 2002/0058173 A1 | 5/2002 | Alberti | |
| 2003/0057150 A1 | 3/2003 | Roudil et al. | |
| 2003/0185956 A1 * | 10/2003 | Gradley | A23F 3/163 426/534 |
| 2005/0092629 A1 | 5/2005 | Choi | |
| 2005/0224418 A1 | 10/2005 | Patton et al. | |
| 2006/0207410 A1 | 9/2006 | Kim et al. | |
| 2007/0163967 A1 | 7/2007 | Pollack | |
| 2009/0134090 A1 | 5/2009 | Pollack | |

OTHER PUBLICATIONS

Ocvchinnikova et al., "Cylindrical phase separation in colloidal suspensions", Phys Rev E Stat Nonlin Soft Matter Phys. Mar. 2009;79(3 Pt 2):036117. Mar. 30, 2009.

* cited by examiner

Concentration Gradient Achieved

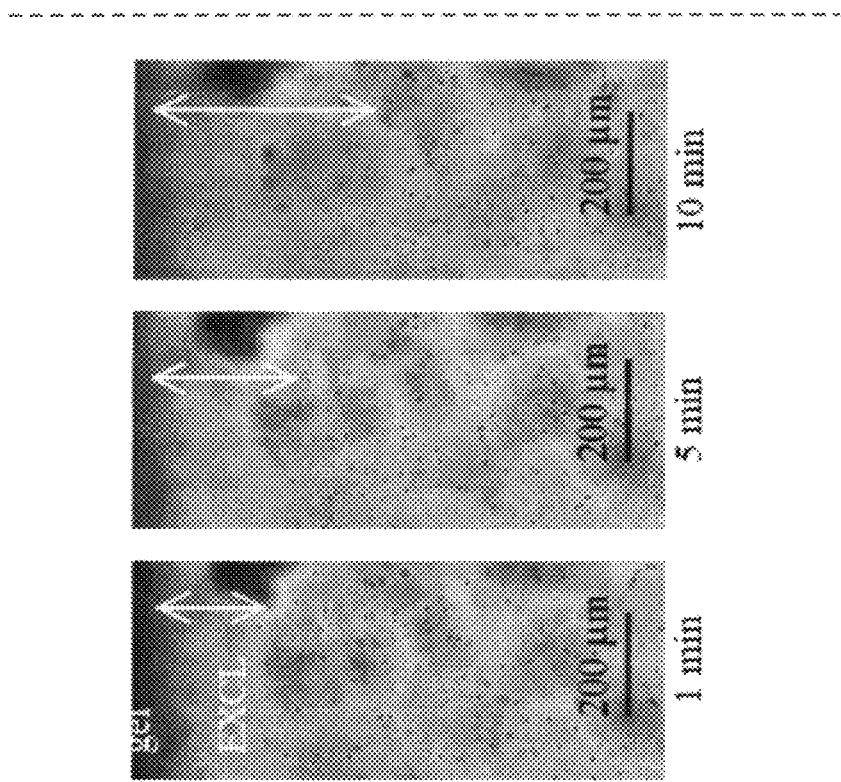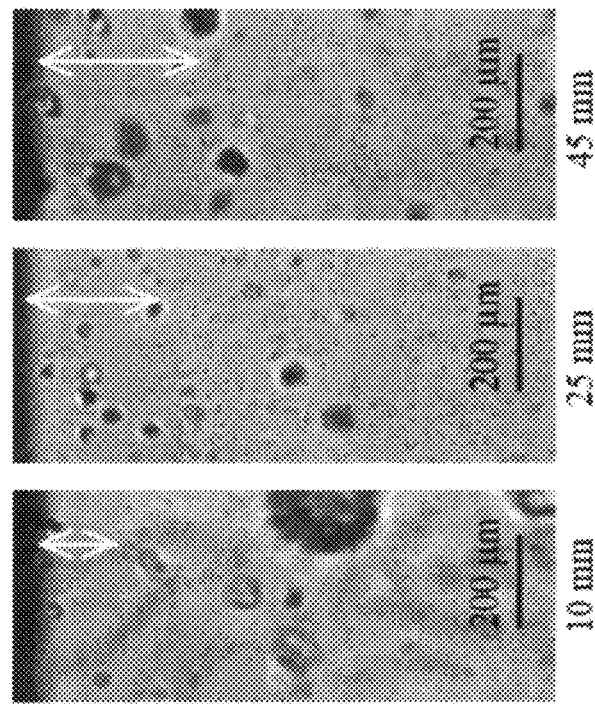
Fig. 11

METHODS FOR COLLECTION FRACTIONS OF MIXTURES, SUSPENSIONS, AND SOLUTIONS OF NON-POLAR LIQUIDS

RELATED APPLICATIONS

This application is a Continuation-in-Part of, and claims priority to U.S. patent application Ser. No. 12/363,189, filed on Jan. 30, 2009, Now U.S. Pat. No. 7,819,259B2 entitled "Separating Components of Aqueous Mixtures, Suspensions, and Solutions", naming Gerald H. Pollack as an inventor; which is a Continuation-in-Part of, and claims priority to U.S. patent application Ser. No. 11/623,719, filed on Jan. 16, 2007, Now U.S. Pat. No. 7,793,788 B2, entitled "Separating Components of Aqueous Mixtures, Suspensions, and Solutions", naming Gerald H. Pollack as an inventor; which claims priority to U.S. Provisional Patent Application No. 60/743,135, filed on Jan. 17, 2006, entitled "Separating Components of Aqueous Mixtures," naming Gerald H. Pollack as an inventor; the disclosures of which are, to the extent not inconsistent with the disclosure herein, incorporated herein by reference.

SUMMARY

Systems and methods are described for separating and/or collecting fractions of fluids including components of mixtures, suspensions, and solutions in polar liquids. In one embodiment, an apparatus flows an aqueous mixture over a hydrophilic surface to form a first region of purified water and a second region of at least one concentrated non-aqueous component. The apparatus can draw off either the purified water or the concentrated non-aqueous components. In one embodiment, an array of tubules performs the differential extraction. In another embodiment, various hydrophilic and/or hydrophobic surfaces are disposed in multiple differential extractors and some effluents may be recycled to perform complex assaying and separation. In another embodiment an apparatus can draw off purified water just beneath an air-water interface.

According to an embodiment, an apparatus for collecting a fraction of a mixture, suspension, or solution of a polar liquid includes a first collector configured to collect a fraction of a mixture, suspension, or solution of a polar liquid at a selected distance at or away from an interface between the polar liquid and air or a hydrophilic surface; and a structure configured to hold the first collector at the selected distance. A first fraction collected from a first region at a first proximate distance at or away from the interface includes substantially pure polar liquid. A second fraction collected at a second distal distance away from the interface in the second region includes a an increased concentration of a solute or particle component compared to the first fraction.

According to another embodiment, a method for collecting a fraction of a polar liquid mixture, suspension, or solution includes receiving, establishing, or accessing a volume of a polar liquid mixture, suspension, or solution; allowing an exclusion zone to form adjacent to an interface between the polar liquid mixture, suspension, or solution and air or a hydrophilic surface; and collecting a fraction of the polar liquid mixture, suspension, or solution at or at a selected distance from the air or hydrophilic surface.

BRIEF DESCRIPTION OF THE DRAWINGS

FIG. 11 is a diagram of an exemplary exclusion zone over time and at different distances along an exclusion surface, according to an embodiment.

DETAILED DESCRIPTION

Overview

Figure 1:
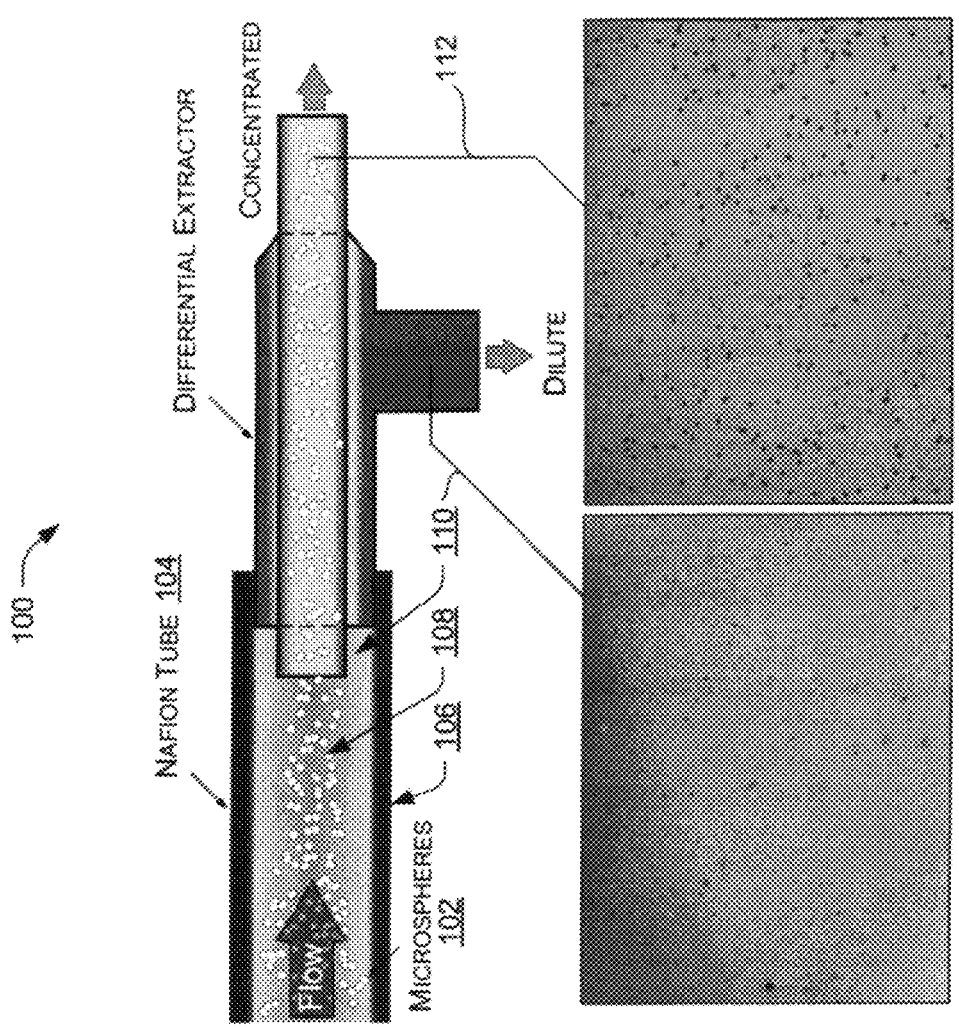
FIG. 1 is a diagram of an exemplary differential extractor for separating components of aqueous mixtures, according to an embodiment.

Embodiments according to this disclosure describe methods and apparatuses for collecting fractions of mixtures, suspensions, and solutions of polar liquids. For example, the polar liquid can consist essentially of water. Other polar liquids that form an exclusion zone adjacent to an interface with a hydrophilic surface or air may behave similarly and have fractions of mixtures, suspensions, or solutions collected.

Illustrative examples relating to the collection of fractions from water are described as embodiments herein, but similar apparatuses and methods may be made and performed using similar approaches with other polar fluids. The term "aqueous mixture" will be used herein to represent an illustrative aqueous mixture, suspension, or solution. To collect fractions, the aqueous mixture is exposed to a hydrophilic surface, such as the inside of tubes made of hydrophilic materials. A region corresponding to a "purified water" fraction forms near the hydrophilic surface in which one or more solutes or other non-aqueous components are partially or entirely excluded. Hence, the hydrophilic surface is also referred to herein as an "exclusion surface." Likewise, a region corresponding to a "concentrated solute" fraction forms "away from" the exclusion surface. Thus, the gradient caused by the exclusion surface can be exploited to obtain fractions of water such as purified water or a concentrated phase of a non-aqueous component.

Such aqueous mixtures include salt solutions, colloids, suspensions, waste water, bodily fluids, mining tailings, etc., that is, most any combination of water and another compound or substance. Non-aqueous components of an aqueous mixture can include organic and inorganic salts, biomatter, pathogens, bacteria etc., and many other solids and semi-solids. For example, the exemplary techniques to be described herein can separate microspheres that are similar in size to bacteria to easily obtain a 20:1 separation.

In one implementation, an exemplary method removes salts from water to obtain efficient desalination. The salts to be separated can include sodium chloride, seawater salts, components of buffer solutions, and many other salts and ionic compounds. Hence, exemplary methods can separate ionic (charged) components from water mixtures, or can separate neutral, non-ionic species from water mixtures too.

From another perspective, the subject matter to be described can concentrate dissolved or suspended species from aqueous solutions. That is, instead of pure water being the only desired product, an exemplary method can be used to concentrate the non-aqueous components of an aqueous mixture. This can be useful in many manufacturing processes and in the clinical lab, e.g., for diagnosing medical conditions via blood work and other physiological tests that involve bodily or cellular fluids. The exemplary methods described herein can be used to separate and/or concentrate salts, pathogens, contaminants, dyes, organic and inorganic species, etc., from aqueous mixtures. Solute size can be as small as a few nanometers (e.g., molecular weight of approximately 300).

In one implementation, multiple separation stages are performed in series, including, for example, a cascade of multiple similar stages iterated to amplify the effect, as well as variegated stages for different materials. Thus, process flow may follow a tree structure or flow diagram analogous to complex stages of a chemical synthesis or purification, in which different components are separated or concentrated at different times and in different quantities by different implementations or instances of the exemplary exclusion surface. The succession of stages allows an exemplary process to exclude more types of solutes from an increasingly purer aqueous mixture. The succession can also improve the purification of a single material, e.g., to automatically obtain a super pure product in the lab. Moreover, a user can specify which non-aqueous species are to be separated out or concentrated from an aqueous mixture.

Exemplary Process

We found that many solutes were excluded from a region adjacent to hydrophilic surfaces. Included among the excluded species were microspheres of various size, erythrocytes, proteins, and even small molecular weight dyes. Salts also appeared to be excluded. The exclusion zone varied in size, but in one implementation was several hundred micrometers wide. Given the large size of this zone, and the exclusion of many solutes, we discovered that the exclusion zone contained "pure" water, which could then be harvested. The formation of the exclusion zone was similar to the formation of ice—which crystallizes to the exclusion of foreign materials in its molecular structure.

In general, negatively charged surfaces exclude negatively charged solutes, and positively charged surfaces exclude positively charged solutes. So, for many different solutes, a surface can be selected that will exclude solutes from a region of pure or purer water. Bacteria, viruses, etc., fall into size and charge domains as solutes that we typically tested, so these too can be excluded from the region of purified water. Biological specimens, such as red blood cells, were also excluded from this region. It is worth noting that negatively charged surfaces do, in general, exclude negatively charged solutes; however, some positively charged solutes are excluded as well. Similarly, positively charged surfaces generally exclude positively charged solutes, but also some negatively charged solutes as well.

Flow Profile Measurements

An initial issue to be tested was whether the water in such an exclusion zone near a surface was or was not bound to the nucleating surface (i.e., a gel, polymer, or other exclusion surface). If the water adhered tightly, then removal would not be easily possible. To pursue this question we used polyacrylic acid gels, with characteristic dimensions of several centimeters, containing a 2-mm channel. Because the gel was clear, the channel could be visualized using an optical microscope. Microsphere suspensions were forced through the channel under pressure. At the entryway, microspheres were uniformly distributed across the cross section. Farther along the channel, an exclusion zone developed: the annulus was clear, while the core region contained concentrated spheres. Still farther along, the clear annulus grew at the expense of the core, and ultimately, after several centimeters, the relative dimensions of annulus and core no longer changed.

To assess whether annular water adhered to the gel surface, we measured volume flow at intervals of several millimeters along the channel. The profile could be measured only in the core, where microspheres were present, and not in the annulus, where there were no markers. Thus, the complete profile could be measured near the entryway, while only partial profiles could be measured farther along. Each profile was integrated to give volume flow. Thus, we could obtain volume flows in the microsphere-containing zones at intervals along the channel. If the integrated flows were equal at all points, then we would have concluded that the annular regions were adherent; only the microsphere-containing regions flowed. By contrast, we found that the integrated profiles diminished significantly with distance along the channel. This meant that volume flow in the microsphere zones decreased progressively along the channel. Or, in other words, some of the flow had to come from the clear annulus. We established that the annular region did, indeed, flow (at least in part), making possible the exemplary techniques.

Apparatus for Solute Separation

As shown in FIG. 1, an exemplary "differential extractor" 100 separates a solution into concentrated and dilute (clear) fractions. The principle of the extraction is also illustrated in FIG. 1. A homogenous microsphere suspension 102 enters a NAFION tube 104 at one end (DuPont Corporation, Wilmington, Del.). NAFION is a Teflon-like polymer with exposed sulfonate groups, used in fuel cells, actuators, and other applications. In one implementation, NAFION was found to be an ideal exclusion surface and will be referred to herein as a representative material for the exemplary exclusion surface, although other materials can also be used for the exclusion surface. As the solution travels through the NAFION tube 104, the microspheres 102 migrate from the walls 106 of the tube 104 and gather in the core region 108. Clear water from the exclusion zone 110 and microsphere-containing water 112 pass through different channels of the extractor 100, and are then collected. In one implementation, the differential extractor 100 is used to extract clear water.

Figure 2:
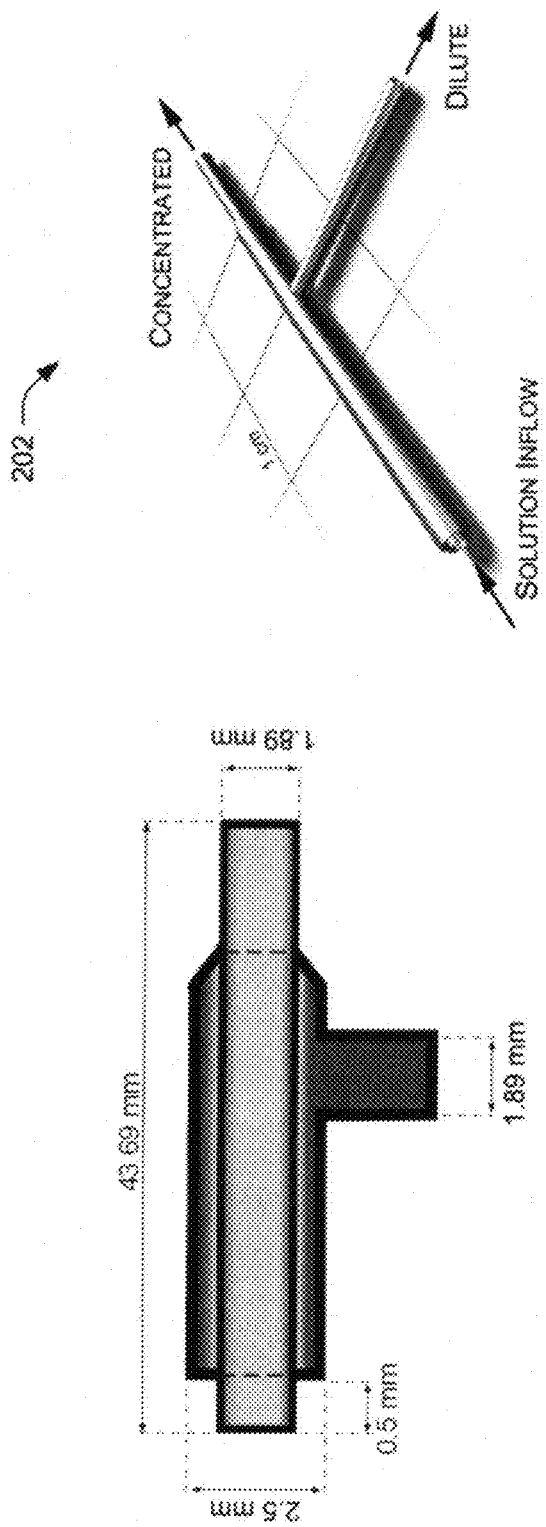
FIG. 2 is a diagram of exemplary dimensions of one implementation of the differential extractor of FIG. 1, according to an embodiment.

In FIG. 2, the dimensions of one implementation of the exemplary differential extractor 100 are given. An elevation view 202 shows the two different channels that draw off the concentrated and diluted products of the separation. Of course, either the concentrated or diluted products of the extractor 100 can be subjected to subsequent instances of the extractor 100 to provide further concentration or dilution of the particular product. The concentration branch or the dilution branch of the extractor 100 can even be looped back to the input of the NAFION tube to recycle the particular product multiple times through the same extractor 100.

Figure 3:
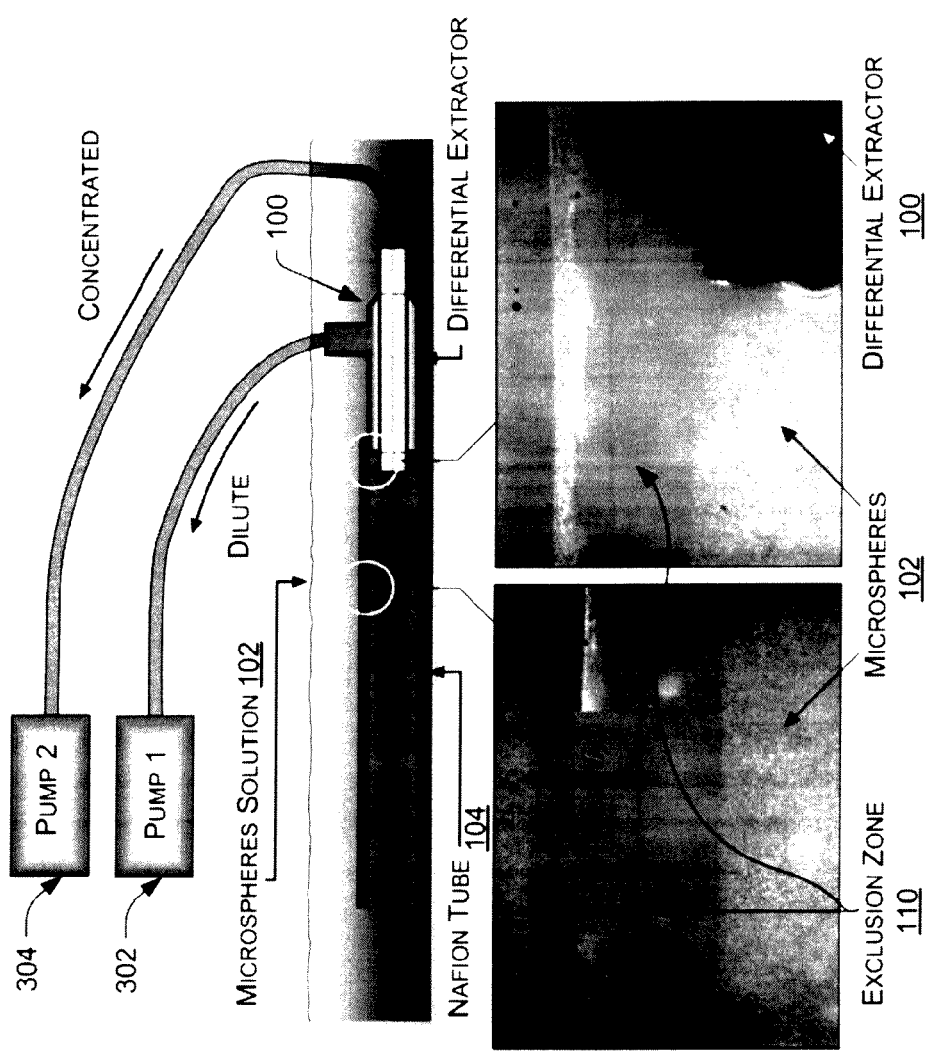
FIG. 3 is a diagram of an exemplary system for separating components of aqueous mixtures, according to an embodiment.

Another implementation of an extraction schema is shown in FIG. 3. Pump "1" 302 and Pump "2" 304 reduce the pressure in the peripheral channel and the center channel, respectively, to facilitate collection. Pressure reduction in the channels results in inflow of solution into the channels with linear velocity proportional to the negative pressure generated by each pump. The negative pressures can be adjusted so that the linear velocity is equal in both channels. The concentrated and dilute solutions can be collected in different syringes. Importantly, in this implementation, the tube 104 itself can be immersed in the, e.g., microsphere 102 (or salt) solution. Hence, the initial concentration in the solution outside the tube 104 is the same as that of the solution inside.

Three differential extractors 100 are described as examples. In one implementation, the extractor 100 is constructed with glue. Brass bushings are used for maintaining tube concentricity. The proximal end of the extractor 100 is initially flush. This implementation shows that the exemplary extractor 100 can be made of diverse materials, as long as they are impervious to the components being separated.

In another implementation, the extractor 100 can be constructed from stainless steel tubing, and overall lengths can be increased to accommodate some different features. In this case, the extractor 100 incorporates an extension sleeve on the outer tubing to increase extraction efficiency.

In yet another implementation, the differential extractor 100 has larger diameter stainless steel tubing to accommodate a relatively larger NAFION tubing 104 that, especially effective for some applications. For example, construction can be carried out with low temperature silver solder, and concentricity can be maintained by dimpling the outer tube. The distance between inner and outer tube, the annulus, can be approximately 0.1 mm. Also, the central tube, used to collect highly concentrated microspheres, can be extended out 0.5 mm at the proximal end. This makes it possible to visualize the extraction process microscopically. This, in turn, may allow flows to be regulated in a sensitive manner to match the relative size of the exclusion zones. In one implementation, the smaller the exclusion zone 110, the larger should be the difference of flow in order to achieve good separation. Given the availability of a sensitive manner of adjusting flows, 10-20 times concentration difference can be obtained (e.g., see images in FIG. 1).

The particular geometry and materials employed in the exemplary extractor 100 can be varied to improve results for a particular application. For instance, a polyacrylic-acid gel may also be used as the exclusion surface.

In one implementation, particles in the micron-size range can be separated out of water using the exemplary techniques. Depending on refinement of the implementation, the extractor 100 may achieve a 10:1 or 20:1 concentration difference ratio between purified water and microsphere enriched output. With multiple extraction stages in series, e.g., using different extraction surfaces, superb separation ratios are achievable. Separating (micron-sized) pathogens is therefore possible.

Spectrophotometric Studies

In one implementation, relatively slow flow in the NAFION tube is maintained in order to prevent turbulence, which increases reliability and may be used in circumstances in which the speed of extraction is of secondary importance. For example, in a model implementation, 100 ml of concentrated and 10 ml of dilute solution were collected over 10-12 hours.

Figure 4:
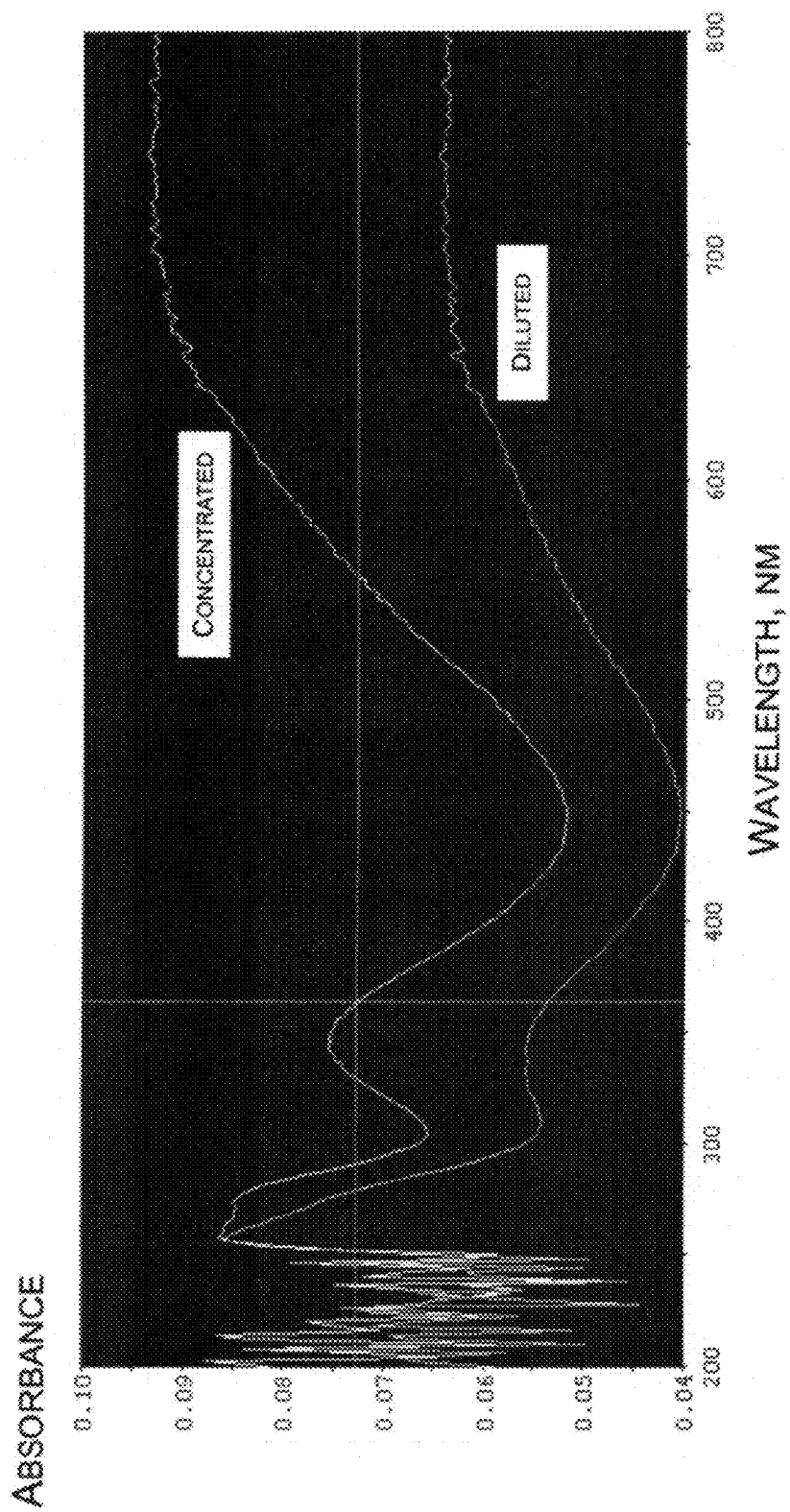
FIG. 4 is a diagram of concentration gradients achieved by an exemplary system, according to an embodiment.

An exemplary method was adopted to detect even small differences in concentration. We found that spectrophotometer readings gave the first sign of successful separation, albeit sometimes they were very small. After two fractions were collected, absorption spectra were obtained for concentrated and dilute species using a UV-VIS spectrometer. Examples of absorption curves are shown in FIG. 4, where the upper curve corresponds to the concentrated fraction and the lower curve corresponds to the purified fraction. The result corresponds to one implementation, in which the separation ratio was relatively low, approximately 1:2 or 1:3. Early development of the separation principle also showed that the spectrophotometric method could be used as a sensitive detector of even subtle differences between fractions.

Microsphere Counting

After the spectrophotometric approach for detecting a concentration gradient was pursued, an initial gel implementation was replaced by the NAFION tubing described above, and improved extractors were thereby developed. As development of exemplary methods progressed, the concentration difference between fractions grew sufficiently large, up to 20:1, that it could be seen by the naked eye, or measured accurately by use of a microscope.

Thin layers of the concentrated and dilute fractions were therefore created and viewed with a microscope. Since the microscope has a finite depth of field, direct counting of microspheres in the field gives the number within some fixed volume, i.e., the concentration. By comparing the number of the microspheres in the respective fractions, the concentration difference could be ascertained. In one phase of development, approximately ten experiments were carried out. The layers of solution were of the same thickness, ca. 0.1 mm. The area was 1-2 square cm.

One result obtained using this approach showed a separation of between approximately 10:1 to 20:1. However, in this implementation the ratio was strongly dependent on the desired collection rate. If water from the outer annulus was drawn very slowly, we estimate that, practically, it will be possible to obtain separation coefficients of 100:1 or even higher—mainly because the exclusion zone never contains microspheres, even when the microsphere concentration is raised to high values.

Further Experimental Details

Initial microsphere concentration was $2.84 \times 10^6$ particles/ml in most experiments during development. In the photographs presented, the initial solution concentration was $1.13 \times 10^7$ particles/ml. POLYBEAD Carboxylate 2.0 μm microspheres were used and were diluted in distilled water (Polysciences, Inc., Warrington, Pa.).

The extraction speed, i.e., the volume flow inside the NAFION tube, was 1 ml/hour if the experiment was conducted overnight or 4-5 ml/hour during the daytime. With this speed, we collected 2 ml of dilute solution per 10 ml of concentrated solution; generally this took 2.5 hours.

Salt Separation & Small Osmolality Difference Measured with the Osmometer

After experiments with the microspheres were carried out, we began experiments with salt solutions (e.g., sodium chloride, ~500 mmol/l). Initially, these experiments were carried out the same way as with the microspheres solution. The experimental setup was similar or the same, although a microscope was not used for adjusting the flow velocity because no microsphere markers were present. Of seven example experiments conducted, four showed osmolarity difference between "concentrated" and "dilute" fractions. Experimental results for these are shown in the Table (1) below.

TABLE 1

| No of Experiment | No of Measurements | "Diluted" Solution Concentration, mmol/l (Dc) | "Concentrated" Solution Concentration, mmol/l (Cc) | Cc-Dc | $\frac{Cc-Dc}{Dc}100\%$ | Average % |
|---|---|---|---|---|---|---|
| 1 | 1 | 466 | 499 | 33 | 7.08% | 7.53% |
|   | 2 | 467 | 505 | 38 | 8.14% |   |
|   | 3 | 475 | 510 | 35 | 7.37% |   |
| 2 | 1 | 673 | 733 | 60 | 8.92% | 7.81% |
|   | 2 | 687 | 733 | 46 | 6.70% |   |
|   | 3 | 690 | 744 | 54 | 7.83% |   |
| 3 | 1 | 630 | 651 | 21 | 3.33% | 3.10% |
|   | 2 | 632 | 651 | 19 | 3.01% |   |
|   | 3 | 644 | 663 | 19 | 2.95% |   |
| 4 | 1 | 964 | 1001 | 37 | 3.84% | 5.23% |
|   | 2 | 984 | 1032 | 48 | 4.88% |   |
|   | 3 | 1005 | 1075 | 70 | 6.97% |   |

The repeatability of the salt solution separation measurements in each experiment was significantly high. In some circumstances, it may be that the exclusion zone is considerably smaller with high concentrations of salt than with microspheres in pure water; hence, the outer annulus collected some pure water and mostly salt water. A collector with smaller annulus can be built for salt exclusion.

NAFION Tube Swelling Experiments

We observed that sometimes, some grades of NAFION swell less in salt solutions than in pure water. The higher the osmolality, the less the NAFION swells. Thus, one possibility is that salt ions are held by the water molecules—they do not enter the NAFION polymer, either within the NAFION wall itself, or immediately around the wall. In other words, they may not penetrate into the exclusion zone.

We hypothesized that if salt ions do not enter in or around the polymer network, then, as the NAFION swells, the salt concentration of the solution used to swell the NAFION becomes higher. This hypothesis was tested in the following experiment. First, a salt solution of known concentration was pumped inside the dry NAFION tube. The outside of the tube was dry. After approximately 10 minutes the NAFION tube swelled, at the expense of the solution inside. Then, the remaining solution was pumped out of the NAFION tube, and its osmolality was measured. Three experiments were carried out. Each time, there was an osmolality increase following swelling (see Table (2) below). Hence, the results support the hypothesis: it appears that salt is excluded from around the NAFION polymer; only water appears to enter.

Figure 5:
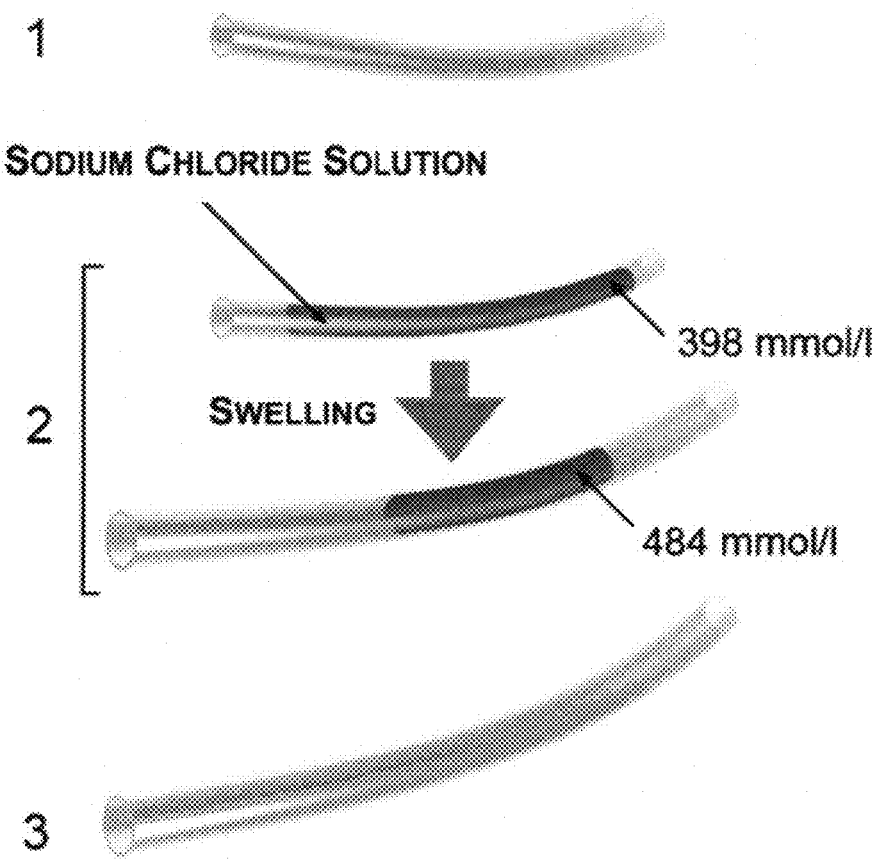
FIG. 5 is a diagram of swelling of an exemplary material used in a differential extractor, according to an embodiment.

To check this result, calculations were made based on the assumption that only water molecules enter the NAFION polymer network. The NAFION tube was weighed as shown in FIG. 5, before and after swelling, and therefore the amount of water that enters was known. With this data, it can be calculated what the predicted concentration increase in the tube's lumen should be. Table (2) below shows excellent agreement, within several percent. Hence, the assumption that no salt enters in/around the NAFION polymer was tentatively validated.

Controls were made to test the possibility that the observed increase of osmolality might arise artifactually, from some chemicals diffusing out of the NAFION. This possibility was tested by swelling the NAFION in deionized water instead of salt water. The solution removed from the NAFION tube showed no measurable increase of osmolarity. Hence, the increase of osmolality in Table (2) below was considered to have arisen from salt, excluded from the NAFION network.

There may be a distinction between the water lying within, and immediately outside of, the NAFION tubing. Both are in the vicinity of polymer. If they behave similarly, then salt is deemed to be definitely absent from the exclusion zone. If not, then it is possible that the salt is excluded only from the water fraction lying within the tubing, but not from the fraction adjacent to it.

TABLE (2)

| Solution concentration before NAFION swelled (mM) | Solution concentration after NAFION swelled (mM) | Predicted Solution concentration (mM) | % error |
|---|---|---|---|
| 398 | 484 | 470 | 2.3 |
| 401 | 475 | 455 | 4.2 |
| 422 | 480 | 464 | 3.3 |

Alternate Embodiments

When experimenting with microsphere suspensions, we found that it is possible to draw small amounts of microsphere-free water from the exclusion zone. Practical success depends on how small the exclusion zone is with salt present. In the case of salt solutions, a NAFION tube can be used to create an exclusion zone. Then, a micropipette with tip diameter of, for example, 10 μm can be used to suck water via a tiny opening adjacent to the NAFION surface. By repeating this many times in a model setup, it is possible to collect solution, e.g., enough solution for osmolality measurements. Alternatively, a single step sample can be used to collect a very small amount of water. Speed of evaporation of this solution can be compared with evaporation of the solution taken farther from the NAFION surface. Practically salt-free water should evaporate more rapidly than relatively salty water.

Another measurement approach uses a sodium-sensitive electrode. These can be obtained with tips on the order of 1 mm, and even smaller tips may be available. If the exclusion zone is large enough, then the electrode should reveal the spatial distribution of concentration in the vicinity of NAFION. If necessary, the concentration of salt could be reduced to expand the exclusion zone.

In one implementation, an extractor collects water from a narrow annulus, e.g., much narrower than the 100 µm used in one implementation in the lab. This facilitates collection of water in situations in which the exclusion zone is much smaller than is the case with microspheres. A NAFION (or equivalent polymer) tube with an array of small holes may also be used, so that the relatively sodium-free water exits outside the tube rather than from an annulus within the tube.

Using Electrical Potential to Increase the Size of the Exclusion Zone

Electrical potentials may also be applied to increase the size of the exclusion zone and hence the efficacy of separation. For example, in one implementation water molecules migrate toward a negatively charged (cathode) surface. That is, the applied charge enhances the hydrophilic character of the exclusion surface, thereby increasing the region of purified water.

In another implementation, a potential difference is applied between parallel wires several cm apart in an aqueous mixture, suspension, or solution. For example, with five volts between the wires, microsphere exclusion may increase to a centimeter or more from the negative electrode. With proper choice of material for the wire(s), (e.g., similar to materials used in maintenance-free auto batteries) bubbles (electrolysis) are virtually absent.

Further Detail

One objective during development was to lay groundwork for an exemplary device that can separate salt and other solutes from water. To design such a device, we observed that solutes tend to be excluded from the zone adjacent to many hydrophilic surfaces. Solutes observed to be excluded ranged from micron-sized colloidal solutes, for example, down to small molecular weight dyes. Hydrophilic surfaces that exclude these solutes include various hydrogels and polymeric surfaces. Exclusion is seen not only in static situations but also when the aqueous suspension or solution flows in channels cut inside of gels, and this formed the basis for several implementations of the exemplary device.

In one implementation, salt water, or otherwise contaminated water, flows into the gel or polymer channel, and the salt molecules progressively migrate from the wall toward the channel axis (center of the tube).

This concentrated solution in the channel core is discarded or recycled, while the pure water in the annular region (i.e., outer region of the tube lumen) is collected. Variations of the exemplary technique were tested under a series of experimental conditions, in order to optimize purification and throughput.

In one implementation, as described above, we examined microspheres suspended in aqueous solution in the vicinity of hydrogel surfaces. The microspheres translated away from the surface, leaving a microsphere-free zone that was unexpectedly large relative to expectations of classical theory (Israelachvili, 1992): depending on conditions, the microsphere-free zone was on the order of 100 µm or more. Because the depletion of microspheres from the vicinal zone left pure water, this principle can be applied to the separation of suspended or dissolved entities, including salt.

Figure 6:
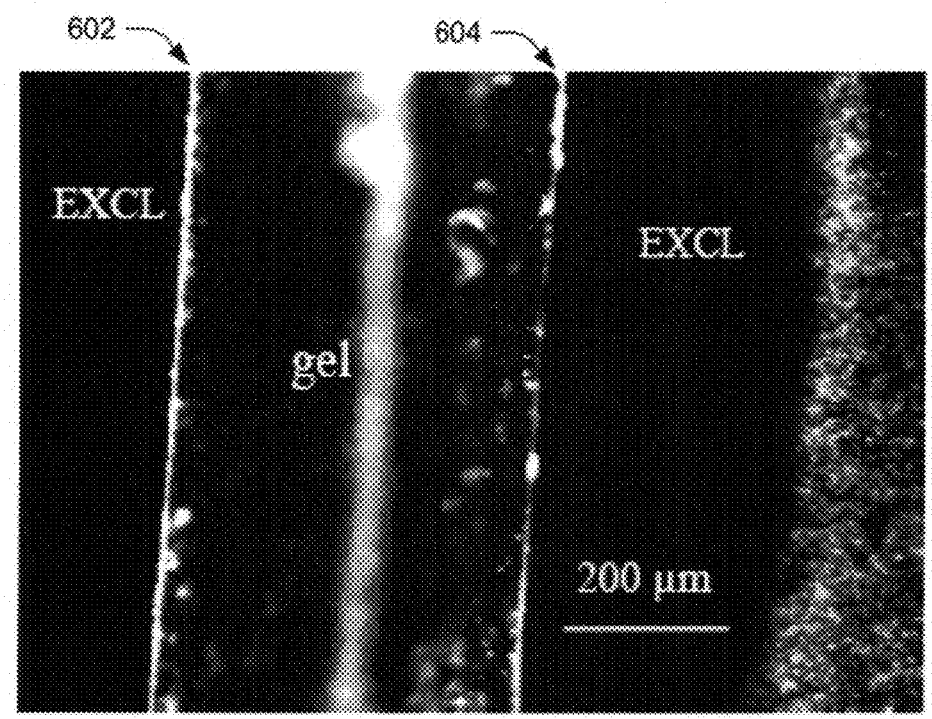
FIG. 6 is a diagram of exemplary solute exclusion, according to an embodiment.

An example of this kind of exclusion is shown in FIG. 6. The gel-water boundaries are the vertically oriented, thin, white lines. (The vertically oriented fuzzy band to the right of "gel" is an optical reflection artifact.) Microspheres migrated away from the gel surface, leaving, within minutes, a zone ~250 µm that was devoid of microspheres.

Figure 7:
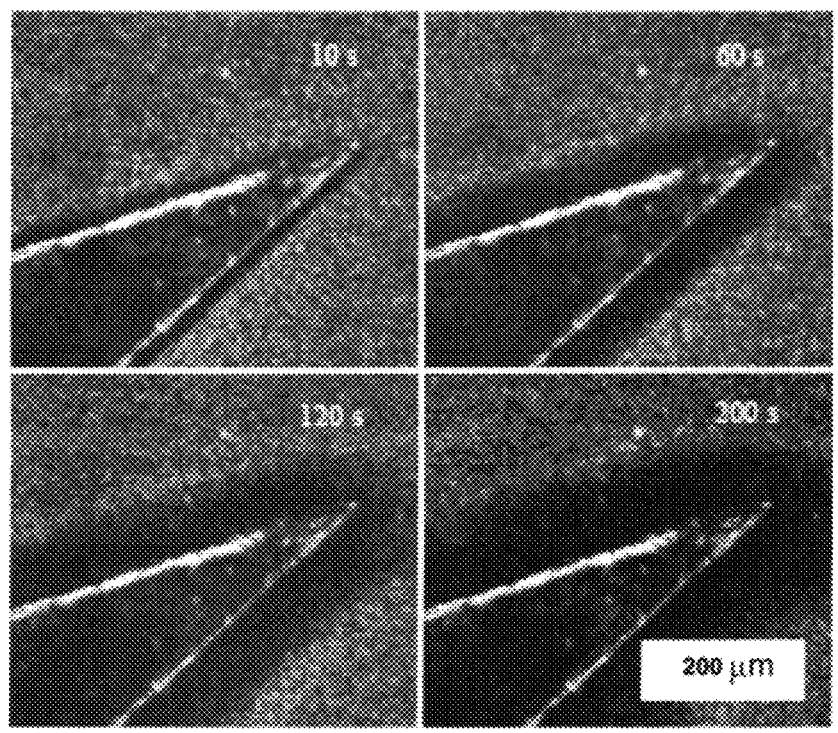
FIG. 7 is a diagram of growth of an exemplary exclusion zone over time, according to an embodiment.

FIG. 7 shows another example of exemplary solute exclusion. In FIG. 7, the exclusion-inducing surface is again NAFION. FIG. 7 shows a time-dependent buildup of the solute exclusion zone, which typically grows in minutes to 0.5 mm or more.

Figure 8:
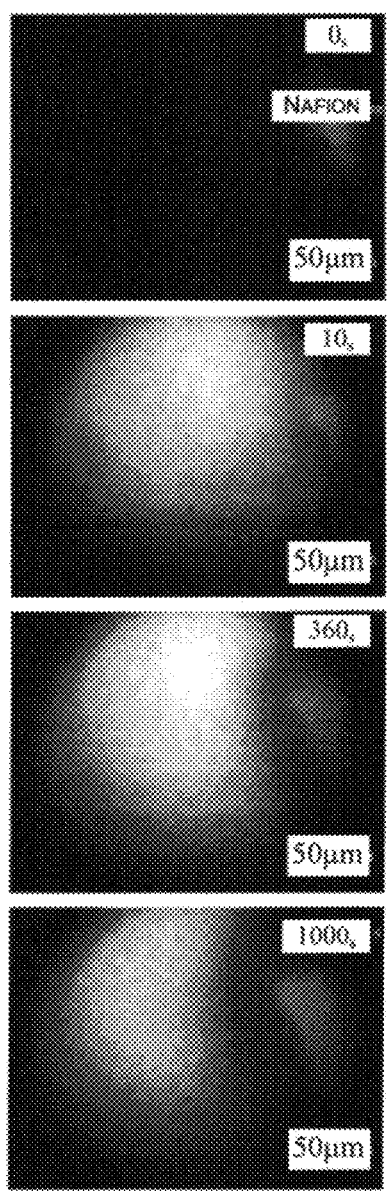
FIG. 8 is a diagram of exemplary separation of a protein from an aqueous mixture, according to an embodiment.
Figure 9:
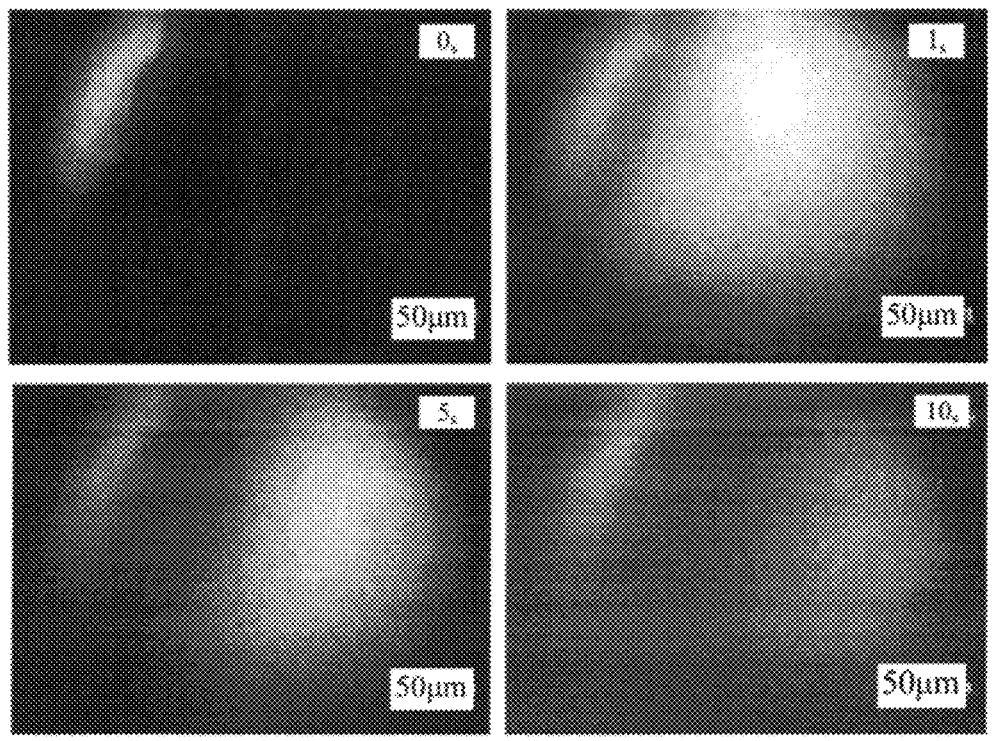
FIG. 9 is a diagram of exemplary separation of a dye from an aqueous mixture, according to an embodiment.

Our subsequent studies have shown the exemplary exclusion methods to be generally applicable. Exemplary exclusion was observed not only in the vicinity of a series of synthetic and natural hydrogels, but also near other hydrophilic surfaces including carboxylated monolayers, PEGylated surfaces, and biological surfaces (muscle and vascular endothelium). In various implementations, excluded species include microspheres of either charge polarity, red blood cells, ion-exclusion resin beads, fluorophore-labeled protein (albumin—as shown in FIG. 8), and various low molecular weight dyes. FIG. 9, for example, shows the time course for exclusion of the fluorophore, sodium fluorescein, in the vicinity of NAFION.

In both cases in FIGS. 8 and 9, these relatively low molecular weight solutes are excluded at least qualitatively by an amount similar to the much larger colloidal microspheres. Thus, the size range of excluded species can be broad from micron-sized particles down to small molecules. All of these solutes, suspensions, etc., are excluded from vicinal water, presumably by some surface induced alteration of that water. In one implementation, we derived evidence that at least three physical features of the vicinal water are different from bulk water: NMR hydrogen nuclei relaxation times; ability to support sustained potential difference; and sharply diminished infrared radiation from the vicinal water zone.

Considering the broad size range of solutes confirmed to be excluded (12 orders of magnitude in mass), molecules beyond this range, i.e., even smaller than the lowest molecular weight dyes (e.g., mol. wt. 376) can be excluded as well.

Figure 10:
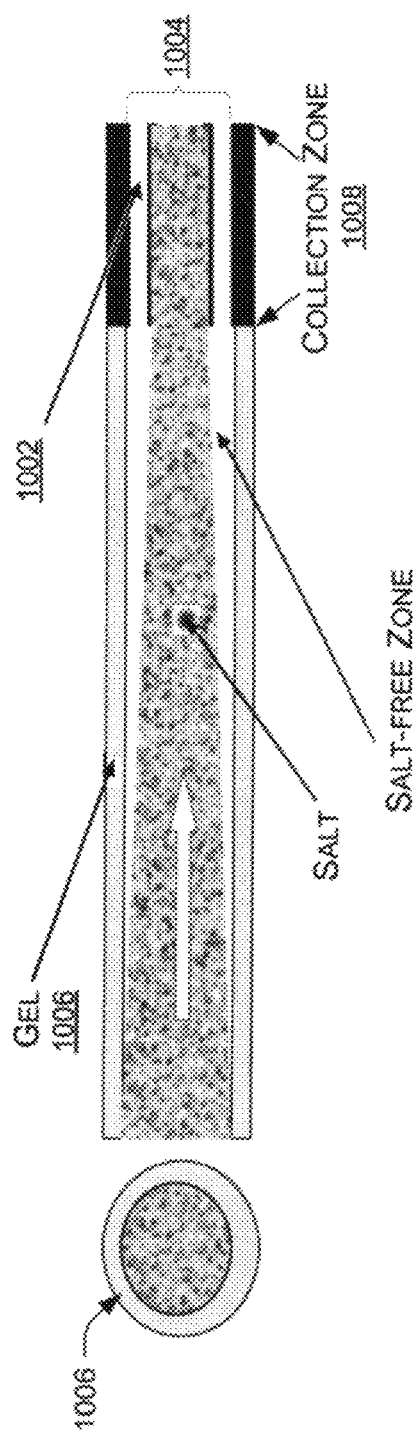
FIG. 10 is a diagram of an exemplary interface between a gel exclusion surface and a collector, according to an embodiment.

In some experiments, we built polyacrylic acid gels (also some polyvinyl alcohol gels) containing long, cylindrical channels, as shown in FIG. 10. Solute-containing water is pumped through the channel; or, in the case of a vertically oriented channel, the suspension can flow by the force of gravity; external power is then unnecessary. At the entry, the solute is distributed uniformly over the cross-section. Farther along the channel, the solute can be progressively excluded from the zone just inside the gel. With sufficient tube length, the sub-annular region will be solute free for practical purposes, or, actually solute free given a theoretically long enough tube.

This solute-free water can then be collected using an annular channel 1002 whose outer diameter 1004 is equal to the inner diameter of the gel (FIG. 10, right side). The solute-containing water in the collection zone 1008 is in the center, i.e., inside the annular solute-free zone being collected by the annular channel 1002. When the solute-containing water is in short supply (e.g., the solute is precious), the solute-containing water can be recovered, so that the process can be repeated in cascading stages.

As shown in FIG. 11, some initial studies were carried out using 1-µm carboxylate microspheres, easily detectable with a compound microscope. Polyacrylic acid gels were molded to contain a cylindrical channel, 1.6 mm in diameter 50 mm long. Using a motor-driven syringe, suspensions of microspheres were driven through the channel. Because the gel was clear, the microspheres within the channel could be easily visualized. Clear, stable, exclusion zones increased with time (and increased faster with smaller molecular weight substances; see FIGS. 8 and 9), and grew to appreciable size at distances sufficiently far from the entry orifice. From the left, FIG. 11 shows the time course of microsphere distribution 45 mm from entry point at various times after exposure to suspension. The gel boundary is the dark region at top. At this low magnification, microspheres are seen as small, uniform dots. On the right in FIG. 11 is seen microsphere distribution and growing exclusion zone ten minutes after exposure, at successive locations (10 mm, 25 mm, and 45 mm) along the channel.

In one implementation, the "solute" is pathogens, to be concentrated for easier identification. Thus, although an exemplary system can be used to separate salt from water, it can also be useful for separating contaminants from water.

One advantage of the exemplary differential extractor 100 is its simplicity. Once designed, it can be manufactured inexpensively, easy to keep functional, and simple to use. Portable units may operate without supply of external electrical power—by using gravity flow. In geographical regions of scarce water supply, gray water, e.g., from a shower, can be recycled, making an exemplary apparatus useful in special environments, such as space vehicles or submarines, where water is in short supply.

NAFION constitutes a powerful exclusion-generating surface in static situations, and may be superior for some applications to gels used to obtain results in flow situations such as that of FIG. 10. NAFION, a durable material, is widely used in fuel-cell applications, and can be micro-machined to contain arrays of micro fluidic channels for quick and effective separation.

In pursuing salt separation, one challenge is detection of differences in concentration of ionic species. While microspheres are detectable under bright field microscopy and fluorophores are detectable under fluorescence microscopy, direct measurements of salt concentration may require sampling of the fluids. One implementation uses a small cylindrical tube inserted near to and parallel to the (polyacrylic gels or NAFION) excluding surface. To prevent premature capillary action while the tube is being positioned, the distal end of the tube can be temporarily sealed. Once the tube is in place, the seal is removed; then fluid flows by capillary action (or can be drawn by a pump if necessary) and collected for later analysis using an osmometer.

In one implementation, the exclusion surfaces of an exemplary differential extractor 100 were obtained as follows. Convenient samples of NAFION are 180-μm-thick sheets, which can be cut for experiments. Polyacrylic acid (PAAc) can be synthesized in the laboratory. For example, a solution can be prepared by diluting 30 ml of 99% acrylic acid with 10 ml deionized water. Then, 20 mg N, N'-ethyl-enebisacrylamide is added as a cross-linking agent, and 90 mg potassium persulfate is added as an initiator. The solution is vigorously stirred at room temperature until all solutes are completely dissolved, and then introduced into a chamber 1.5 mm high, in which a 1-mm glass rod, later removed for cylindrical channel experiments, is suspended at mid-height. Gelation takes place as the temperature is slowly raised to about 70° C. The temperature is then maintained at 80° C. for one hour to ensure complete gelation. Synthesized gels are carefully removed from the capillary tubes, rinsed with deionized water, and stored in a large volume of deionized water, refreshed daily, for one week.

Controls can be carried out first to ensure that collection of fluid by the tube—or even the presence of the tube itself—does not interfere with the exclusion zone. One technique is to monitor the exclusion-zone boundary by optical microscopy, using microspheres (1 μm, carboxylate) as markers. Since the microspheres can be easily visualized, this method also permits the detection of any convective flows. If the tube itself compromises the zone, different materials can be used as alternates. Slow withdrawal of fluid from the exclusion zone typically does not induce much disturbance; however, if any disturbance is noted, the collection rate can be slowed until the disturbance becomes negligibly small, the tradeoff being increased time required for collection.

To sample from a broader, more representative zone, the tube can be steadily but gently withdrawn parallel to the exclusion surface during collection. Again, it may be important to test in the same way as above whether withdrawal disturbs the exclusion zone, and if necessary, collected samples can be analyzed for microsphere contamination.

Once the controls confirm the stability of a given implementation, additional controls can be carried out to test the efficacy of sampling. These tests can be carried out on NAFION and polyacrylic acid surfaces exposed to aqueous solutions of small molecular weight dyes. Dyes are ordinarily separated out satisfactorily. It is useful to confirm the absence of dye from drawn samples of different volume. These samples can be compared against standards in a fluorimeter. This helps to establish the size of sample volumes required to avoid contamination in the salt-exclusion processes.

Next, exclusion of salt can be tested. NaCl concentration can be 100 mM to start. The region of the exclusion zone immediately adjacent to the excluding surface can be sampled first, as this is the region within which salt should be most profoundly excluded. Samples drawn from this region can be tested using osmometry. Next, a micrometer drive can be used to translate the tube to a position ~100 μm more distant from the surface, and samples can again be collected. The protocol can be repeated at 100 μm intervals in order to obtain a profile of [NaCl] vs. distance from the excluding surface. A priori, in one implementation, undetectably low concentrations continue for a distance of several hundred micrometers, followed by a rapid falloff at roughly 0.5 mm from the surface. If increased measurement resolution seems warranted, smaller collection tubes can be used, and spatial increments can be reduced.

Separation can be implemented at different NaCl concentrations ranging from 1 mM up to 1 M (ordinary seawater is 0.4 M to 0.45 M). If increased detection sensitivity is required for low concentrations, atomic absorption spectrometry can be used instead of osmometry—several atomic absorption spectrometers are satisfactory for use. We have noted a diminution of exclusion-zone size with salt concentration, ~40% reduction as [NaCl] rose from nominally zero to 100 mM; hence, with the addition of salt there is a more rapid falloff of separation efficacy with distance from the excluding surface.

The separation of salts other than NaCl is possible too, as water often contains a variety of salts other than NaCl, albeit in lower quantity. The exclusion-zone size may be compromised by different salts in different ways; i.e., reduction of exclusion-zone size depends on the salt's position in the Hofmeister series, K+>Na+>Li+>Ca2+. It can be useful to verify these preliminary observations systematically, and then test the efficacy of separation of each one of them. Ideally, they can be separated with much the same efficacy of NaCl; however if these salts compromise the exclusion zone sufficiently, then collection parameters may need to be adjusted.

Other relevant variables that may be important to test for their ultimate practical value include above all, temperature and pH. The former can be evaluated by using a temperature-controlled stage during salt-separation tests, while the latter can be evaluated by adding HCl or NaOH to vary the pH between 3 and 12 with continuous pH monitoring. The optimum result reveals the absence of any strong dependence of either of these variables on efficacy of separation; however, a noted dependence can be compensated for in the implementation.

In one implementation, the exemplary technique removes sea-salts from seawater. In one process, Puget Sound seawater (Na+=410 mM) was used, and tests were carried out as above. The goal was Na+ removal effective enough to reach EPA drinking-water standards (20 mg/l, or around 0.9 mM) (http://www.epa.gov/safewater/ccl/sodium.html).

In another implementation, the exemplary technique separates bacteria and viruses from the aqueous mixture, for decontamination applications, in much the same way as salt separation was accomplished above.

Detail of Pathogen Separation

Common bacteria have a size in the micrometer range, some larger; hence, they are detectable by optical microscopy, most clearly using phase or DIC microscopy. Viruses elude practical detection by optical microscopy; hence, they can be labeled with a fluorophore and detected by fluorescence microscopy. Excluding surfaces can be the same as those used above, polyacrylic-acid gels, and NAFION. Similar collection strategies as used above can be used in this application. Various common bacteria and viruses were considered, limited to non-pathogenic varieties such as heat-inactivated samples that require no special facilities. Bacteria include: *Escherichia coli* (HB101) and *Pseudomonas aeruginosa* purchasable from American Type Culture Collection (Manassas, Va., USA). Viruses include adenovirus, SV40, and influenza available from Virapur (San Diego, Calif., USA). These can be fluorophore labeled.

Different implementations may vary the conditions used for removing the pathogens. The pH can be varied from 3 to 12 with NaOH and HCl with continuous pH monitoring, and runs can be carried out at each pH value. Salt concentration can be varied from the low level of pure water, all the way up to molar values. Temperature can be varied too, as described above.

In the case of bacteria, and unlike salt, because the exclusion zone is visually detectable, the exemplary technique can measure not only the extent of exclusion, but also the rate at which the exclusion zone develops.

These measurements are performed by abruptly exposing the exclusion surface to a suspension of bacteria, and tracking the time course of exclusion zone development. Such dynamic measurements are important features to bear in mind when a particular exemplary purification system is designed. Another aspect to keep in mind is measurement of separation dynamics during flow in cylindrical tubes (FIG. 10, above).

Having established the basic exclusionary features, including how much each type of solute is excluded and the magnitudes of the respective exclusion zones, the next step is to exploit those features in an implementation. A basic starting point is the implementation of microsphere separation during flow in cylindrical channels that was discussed above.

In one implementation, the channels are easily made: the gel is molded to contain a cylindrical glass rod, which is removed once the gel has set. In the case of NAFION, tubular samples with diameter ~0.5 nm can be obtained from the supplier. Because the NAFION wall is thin, visualizing particles or fluorescence within the channel should engender no serious difficulty.

A syringe pump is used to drive suspensions through the channel (Improved versions of the pump can eliminate residual pulsations and result in higher precision measurements.) For test purposes, a sample may be placed on a microscope stage, flow is imposed by the pump, and the distribution of microspheres is measured at different times at a single location, and at different positions along the channel Such tests reveal the time- and distance-dependence of exclusion prior to manufacture of the implementation.

Measurements such as those just described can be carried out on different solutes. Knowing the size of the exclusion zone in static situations (FIGS. 6-9) will shortcut the number of trials (e.g., flow rate, channel diameter and length, etc.) required to establish reasonable parameters such as flow rate for separation of salt, as well as for separation of pathogens.

Figure 12:
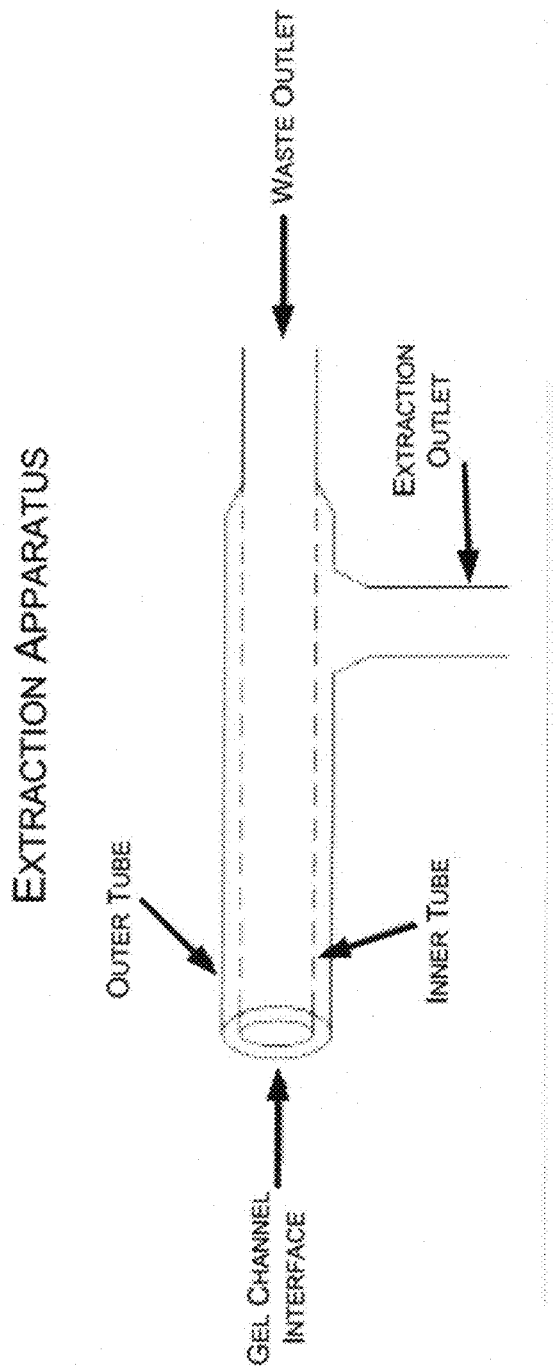
FIG. 12 is a diagram of an exemplary extraction apparatus to interface with a gel exclusion channel, according to an embodiment.

For effective exclusion, different solutes may require different physical and geometric exclusion parameters. However, it may turn out that a particular set of parameters is acceptable for the exclusion not only of salt(s), but also of a range of pathogenic substances. In such a case, it may be possible to remove all of these in a single filtration pass, without requiring multiple stages. FIG. 12 shows a system for collecting purified water, i.e., a fixture designed to collect effluent from a gel separation channel. The collection system is designed to interface with the exit of the gel-separation unit; in FIG. 10, it corresponds to the collection zone 1008 on the right. The design in FIG. 12 involves a double cylinder, for collection of annular (solute-free) and core (solute-containing) flows; similar to that of FIG. 10. An initial design of the unit in FIG. 12 can be made using thin-walled stainless steel tubing. The interface end of the apparatus may be inserted into the end of the gel or NAFION channel. The inner tube or "waste outlet" is designed to catch the solute-containing fluid, and is connected to an exit tube, which either discards the fluid, or saves it for recycling. The annular ring between the inner and outer tube extracts the purified water, which flows out through a side-exit port for collection.

For both fractions, pumps may be useful to facilitate more rapid flow. Dimensions and materials for effective water collection devices may be optimized. The size of the inner cylinder is sometimes critical in ensuring that the maximum quantity of salt or impurity is removed. This follows for two reasons: (i) the salt-containing zone of the separator may need to project entirely within the collector's inner cylinder; and, (ii) the exclusion zone might not exclude uniformly, so that, for example, regions at low radius just beyond the salt-containing zone may still contain some amounts of salt whereas regions at larger radius may be truly salt free. Cylinder diameter can be carefully tested for each solute of interest. Thus, using a set "standard" for gel-channel conditions, collection ducts with a series of internal diameters can be tested to check for optimum efficacy.

It is also useful to check a series of materials other than stainless steel, including various nonreactive metals and polymers, as it is not clear a priori whether a hydrophilic or hydrophobic material will result in optimum collection. Water must flow freely into the tube; yet it should not stick excessively to the tube's walls. Hence some combination of hydrophilic and hydrophobic properties may be necessary to optimize the ability to collect. One important consideration can be the collection speed in the absence of vacuum pumping. This can be important in an effort to make the system independent of the need for external power.

Optimizing an Exemplary System

If drinking water is to be filtered from pathogenic substances, then testing should be done on ordinary drinking water to which pathogens have been added. If purification turns out not to be adequate in these situations, then back-tracking can obtain adequate purification, e.g., by adding one solute at a time to pure water to determine which may be the "offending" agent.

Testing can also achieve the optimum excluding material. Polyacrylic acid gels and NAFION are good candidates, because they produce abundant exclusion. However, these surfaces are not necessarily optimal for all solutes, and there are countless other materials that can be customized for various solutes. In particular, gels and polymers studied thus far have been neutral (polyvinyl alcohol) or negatively charged (e.g., polyacrylic acid). The one positively charged surface (aminated styrene-DVB-copolymer) explored briefly gave positive results. Hence, in some cases positively charged gels (e.g., chitosan) may exclude both pathogenic substances and salt. In such a case, systematic studies including pH dependence can be carried out for optimizing the excluding material. In some instances, complementarity exists between negatively charged and positively charged surfaces, and the most effective separation may include one layer of each, or some spatial surface arrangement of positively and negatively charged regions.

Surfaces to be utilized may include functionalized monolayers (SAMS). Monolayer results obtained with exposed carboxyl groups showed ample exclusion of carboxylate microspheres. The ability to functionalize surfaces opens many possibilities in terms of ultimate manufacture.

In one implementation, the system is as independent of external electrical power as possible. It is also beneficial to balance purification efficacy with rapid throughput. Rapid throughput implies diminishing drag during flow through narrow channels. In one implementation, the friction in tubes lined with certain block co-polymers is massively diminished—by as much as three orders of magnitude (Raviv et al., 2003). If these polymers, e.g., PMMA-PS-GMA, are also found to create exclusion zones for a given solute, then it is possible to achieve reasonable solute separation, while at the same time achieving substantially enhanced throughput as a result of lowered resistance—driven only by the force of gravity. In that situation, the system can operate much like a household water filter, with simple gravity-driven flow.

Figure 13:
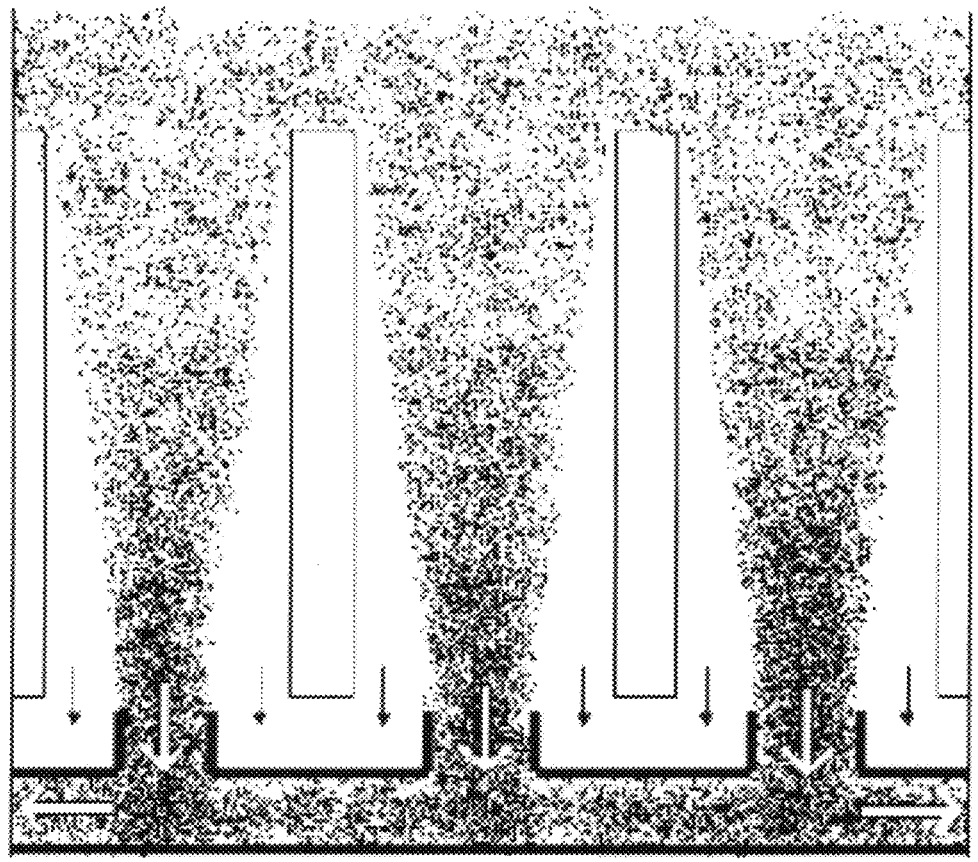
FIG. 13 is a diagram of an exemplary array of differential extractors, according to an embodiment.

In one implementation, an exemplary apparatus is created through microfabrication. If the optimum channel size is in the range of hundreds of microns or less, then microfabrication can create arrays of channels. An example is shown in FIG. 13. The top of FIG. 13 is oriented upward, and the rectangles represent the excluding surfaces. The unpurified water enters at the top, and as it proceeds downward, the exclusion zone grows.

The contaminated water (stippled) exits at the bottom through a connecting channel. The purified water (clear) enters a collecting duct (broad "U" in diagram). Because identical, slab-like units are stacked upon one another, the U-shaped ducts create channels oriented normal to the plane of the diagram. Purified water is collected at the ends of those channels. Slight tilt out of the plane of the paper can bias the flow in one or the other direction, facilitating collection.

The exemplary array of FIG. 13 can operate purely by gravitational force or by pumps to facilitate flow.

Exemplary Methods

Figure 14:
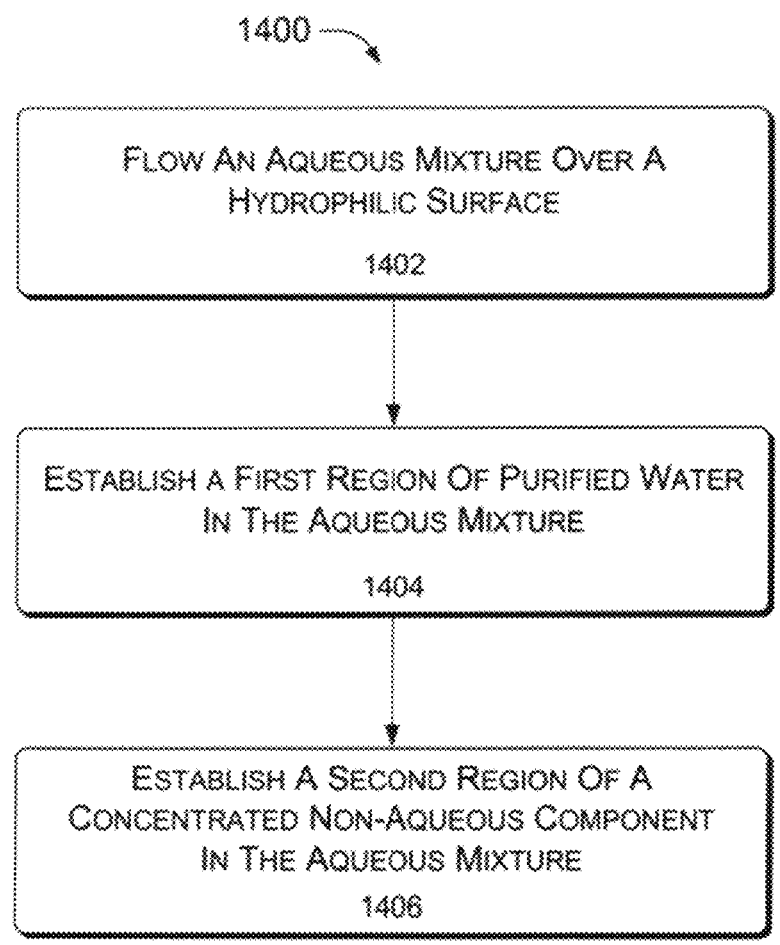
FIG. 14 is a flow diagram of an exemplary method of separating components of aqueous mixtures, according to an embodiment.

FIG. 14 shows a representative exemplary method 1400 of separating components of aqueous mixtures. In the flow diagram, the operations are summarized in individual blocks. The exemplary method 1400 may be performed by hardware, such as the exemplary differential extractor 100.

At block 1402, an aqueous mixture (suspension, solution, etc.), is flowed over a hydrophilic surface, i.e., an exclusion surface, or in some cases a hydrophobic surface. Example materials for such an exclusion surface are certain gels, polymers; NAFION, etc.

At block 1404, purified water can be collected in a first region near the hydrophilic surface. The exemplary differential extractor 100 may have an annular tube that lifts only the purified water.

At block 1404, one or more concentrated non-aqueous components of the aqueous mixture may be collected in a second region beyond the first region of the purified water, with respect to the exclusion surface. The exemplary differential extractor 100 may have a center or core tube that draws the concentrated non-aqueous components from the apparatus.

Alternative Implementation

In an alternate implementation, it has been found that solutes were excluded from a region just below the top surface of water, at the air-water interface. With a chamber (or tank) made from two large flat pieces of glass separated by 3 mm, a microsphere suspension was added, and the chamber was viewed facing one of the glass pieces. The zone just beneath the surface began to clear. Within 30 minutes a 2-mm zone (herein referred to as an exclusion zone) was fully devoid of microspheres. The exclusion zone remained devoid of microspheres for many hours. This was not the result of microsphere settling, which took place at approximately 24 hours after filling the chamber.

Other implementations to create water separation in an aqueous solution are described in an article titled "Cylindrical phase separation in colloidal suspensions," by Kate Ovchinnikova and Gerald H. Pollack (accepted for publication in Physical Review E by the American Physical Society, January, 2009), which is hereby incorporated by reference.

Figure 15:
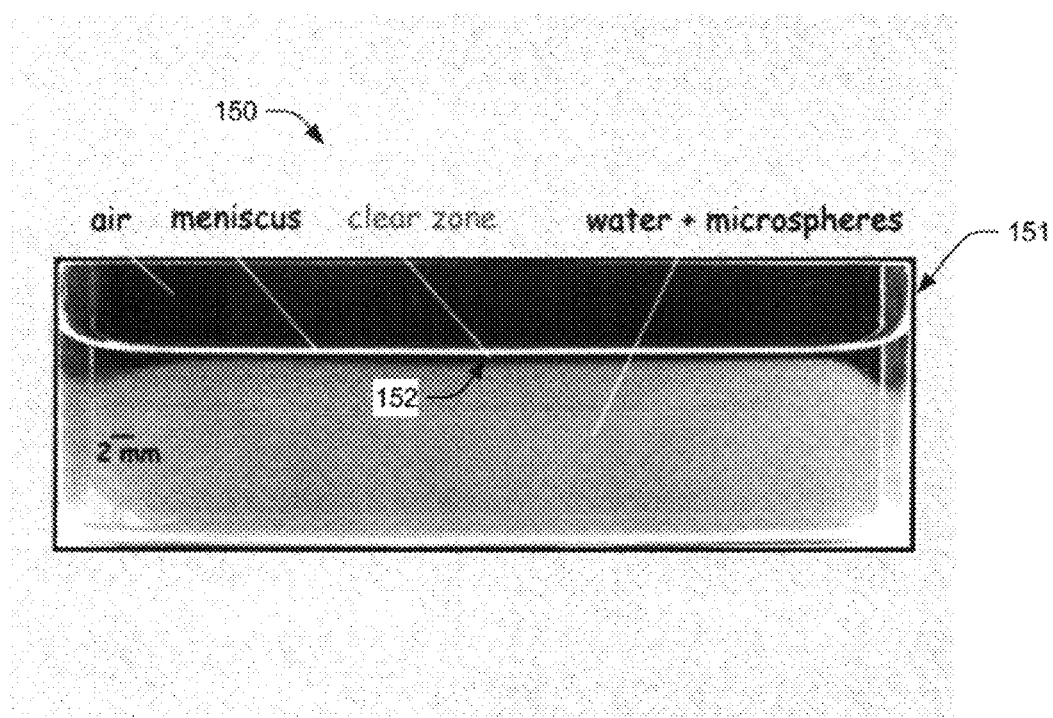
FIG. 15 is diagram of an exemplary exclusion zone just beneath an air-water interface, according to an embodiment.

An example diagram 150 of a tank 151 including an aqueous solution with an air layer, a meniscus layer, and bulk water, which may contain microspheres and is thus labeled "water+microspheres." The clear zone, corresponds to the exclusion zone 152 is shown in FIG. 15. The exclusion zone 152 has characteristics similar to the exclusion zones described above. When the aqueous solution contains microsphere markers, not only does the zone 152 exclude those microspheres, but also its upper region has negative potential, much like exclusion zones. Further the solution remains at constant width even as the upper surface of water is lifted and moved from side to side with a vertically oriented charged rod. Hence, this zone 152 is mechanically cohesive, much like exclusion zones.

The tank 151 may be used for establishing a volume of an aqueous mixture having a surface. In addition an apparatus collects water at the surface of an aqueous mixture. The apparatus may establish an exclusion zone 152 with a depth in the aqueous mixture. In one implementation, the apparatus may collect water at the surface when the depth of the aqueous mixture is greater than approximately four times the depth of the exclusion zone 152, although any depth may be suitable provided the depth of the aqueous mixture is greater than the depth of the exclusion zone. The aqueous mixture may include a mixture of water, particles and solutes and includes particles and solutes whose removal is desired. In one implementation the depth of the exclusion zone 152 is about 2 mm.

A collection apparatus including a tube may collect water and transfer the collected water from a tank 151 to a collecting chamber. The collection apparatus may stop collecting when the water in the exclusion zone 152 has been fully transferred from the tank 151 to the collecting chamber. An apparatus may also be provided to admit more mixture to the tank 151 to let the exclusion zone 152 build for later collection.

In another implementation a skimming apparatus (as generally known) that includes the tube may continuously skim the exclusion-zone water on the surface of the aqueous solution or aqueous mixture. A controller to the skimmer may be provided to adjust the collection rate from the tank 151 to a collection chamber so that a rate of buildup of water in the exclusion zone 152 and collection of water reach a steady state.

The presence of a solute-exclusion zone at the upper surface of water provides an environment in which water can be skimmed off to provide purified water.

In one flow embodiment, a tank's 151 upper zone is connected through a downward slanted tube to a lower collecting chamber. A valve opens periodically to allow flow from tank 151 to collecting chamber to occur. The tank 151 is then replenished with the aqueous solution.

In another embodiment, an upper zone in tank 151 is set up similar to the flow embodiment except that a pump is used to facilitate withdrawal of the top layer.

In another embodiment, the upper zone of the tank 151 is set up similar to the flow embodiment except that multiple stages are used to achieve further purification.

Illustrative Fraction Collection

Figure 16:
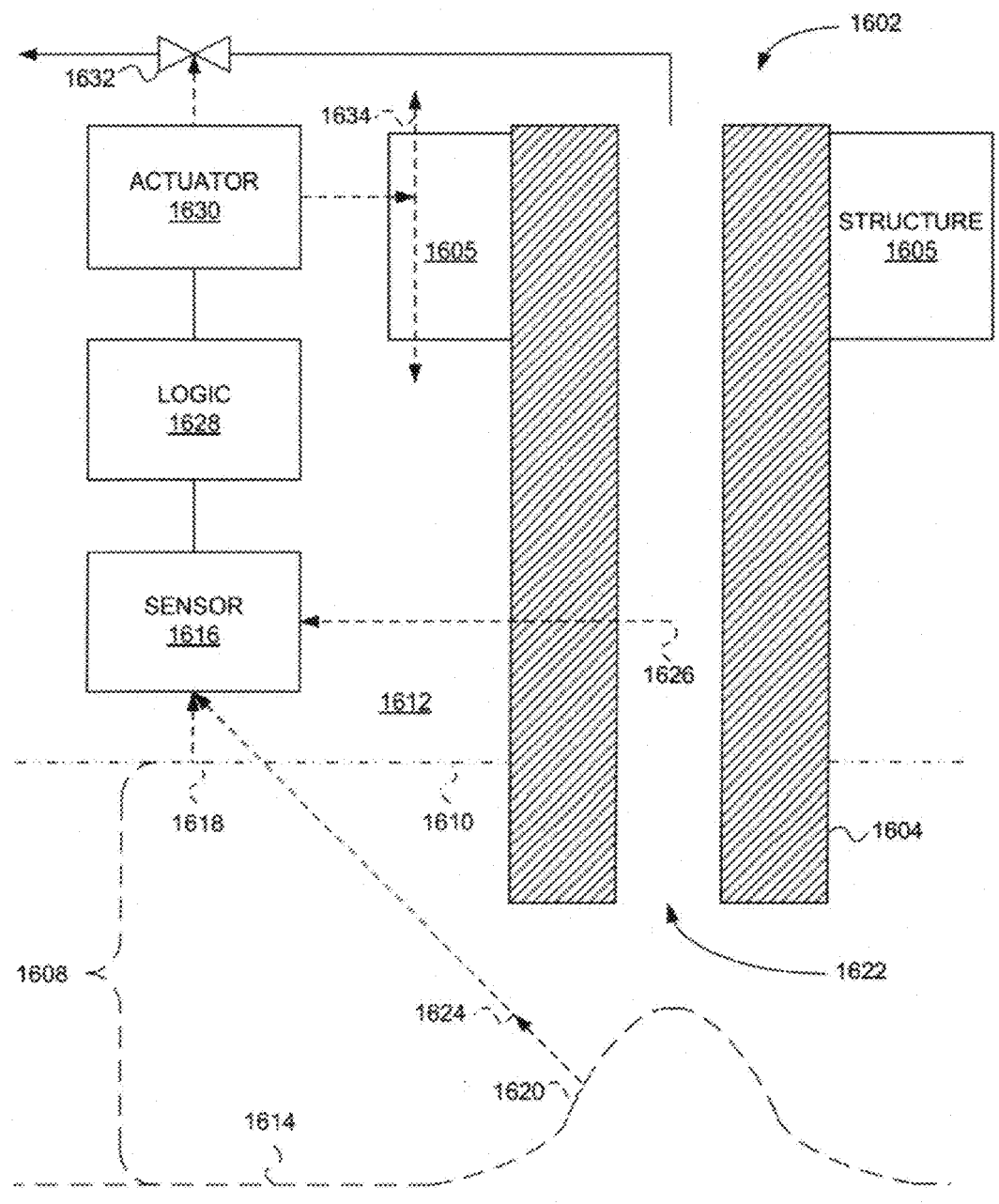
FIG. 16 is a diagram illustrating principal features of an apparatus for collecting a fraction of a mixture, suspension, or solution of a polar liquid, according to an embodiment.

FIG. 16 is a diagram illustrating principal features of an apparatus 1602 for collecting a fraction of a mixture, suspension, or solution of a polar liquid, according to an embodiment. As used herein, a fraction is defined as a concentration of a mixed component, suspended component, or solute different from other concentrations of the mixed component, suspended component, or solute at different distances from an interface 1610 (described below).

A first collector 1604 such as a collection tube is configured to collect a fraction of a mixture, suspension, or solution of a polar liquid 1606, 1608 at a selected distance at or away from an interface 1610 between the polar liquid and air or a hydrophilic surface 1612. A structure 1605 is configured to hold the first collector 1604 at the selected distance. A first fraction collected from a first region 1608 at a first distance at or away from the interface 1610 may comprise substantially pure polar liquid. A second fraction collected at a second distance away from the interface in the second region beyond a boundary 1614 comprises a an increased concentration of a solute or particle component compared to the first fraction. The first region 1608 is also referred to as an exclusion zone that is formed by an interaction between the polar fluid 1606, 1608 and the air or hydrophilic surface 1612 according to mechanisms described herein. The polar liquid 1606, 1608 may be water.

According to an embodiment, the first collector may be held at the first distance selected to collect the first fraction comprising substantially pure polar liquid from the first region 1608 (exclusion zone), as shown. In some embodiments, the first region may extend to a distance of about 2 mm from the interface 1610, where it forms the border 1614 with the second region.

Alternatively, the first collector may held at the second distance beyond the boundary 1614 selected to collect the second fraction comprising the increased concentration of the solute or particle component (configuration not shown). Alternatively a first collector 1604 may be held at a first distance selected to collect the first fraction comprising substantially pure polar fluid from the first region, and a second collector (not shown) may be held to collect the second fraction comprising the increased concentration of the solute or particle component from the second region. Alternatively, a larger number of collectors 1604 may be held to collect various fractions. Such collectors 1604 may be configured to each collect potentially a different fraction from a different distance from the interface 1610, or may be configured to collect substantially the same fraction at substantially the same distance from the interface 1610.

The structure 1605 may be configured to hold the first collector 1604 in a substantially constant position at or away from the interface 1610 between the polar liquid 1606, 1608 and air or a hydrophilic surface 1612. For example, the structure 1605 may include a float configured to provide buoyancy to hold the collector 1604, and/or other associated hardware or liquid near the surface 1610 or an air 1612 interface. Optionally, the apparatus 1602 may include a vessel (not shown) for holding the mixture, suspension, or solution of the polar liquid 1606, 1608.

FIGS. 3, 4, 6, 7, 8, 9, 11, and 15 illustrate sensing or output from sensing one or more of a position of the interface 1610; a depth of an interface 1614 between first and second regions corresponding to an exclusion zone 1608 and concentrated phase, respectively; a concentration of a mixed component, suspended component. Moreover, referring to FIG. 16, a concentration of a mixed component, suspended component, or solute collected 1624 by the fraction collector 1604 through an opening 1622 may be sensed. For example, referring to FIG. 3, the exclusion zone 110 and microspheres 102 (aka, the concentrated phase) are visualized from an optical detection technique, in this case sensing using a focal plane array image sensor coupled to receive an image through microscope optics. Similarly, FIG. 4 (as described by paragraph 38) shows optical absorbance profiles used to characterize and determine differences between the exclusion zone (aka, diluted) and the concentrated phase. Thus, an optical sensor can be used to determine the presence or absence of a solute or suspension at various locations relative to a fraction collector.

Electrical sensing may also be performed to determine characteristics and location of an interface, exclusion zone, and concentrated or "bulk" phase. For example, the concentration of a salt solution can be correlated to the electrical conductivity of the solution. Thus an electrical sensor can be used to determine characteristics and location of an interface, exclusion zone, and concentrated or "bulk" phase. Such a sensor may be made to measure presence/absence of a polar liquid, and/or conductivity or resistivity of the polar liquid at various locations (e.g., distances from an exclusion zone-forming interface 1610) in a solution.

Moreover, as described above, a structure (e.g. including an actuator such as a micrometer drive) to hold and/or move a collection tube 1604.

A sensor 1616 may similarly provide feedback to a control system to determine a collection location of a collection tube 1604, for example to establish or maintain collection of a selected fraction of the polar liquid and mixed, suspended, or dissolved particles or solutes. According to an embodiment, the selected fraction may be substantially pure polar liquid. According to another embodiment, the selected fraction may include an enriched concentration of suspended or dissolved particles or solutes. Similarly, a sensor 1616 may be used to provide feedback for selecting one or more of a plurality of collectors 1604 for collection.

Referring to FIG. 16, the structure 1605 may be configured to hold the first collector 1604 at an adjustable 1634 distance at or away from the interface 1610 between the polar liquid and air or a hydrophilic surface. One or more sensors 1616 may be configured to sense and output a sensor signal or data corresponding to one or more of a position 1618 of the interface between the polar liquid and air or a hydrophilic surface; a position 1620 of an interface 1614 between the first and second regions; a concentration of a mixed component, suspended component, or solute in the vicinity 1624 of the first collector 1604 (and/or any second collector), such as near the intake 1622 of the first collector 1604; or a concentration of a mixed component, suspended component, or solute collected 1626 by the first collector 1604 (and/or any second collector).

A sensor signal or sensor data may be output by the sensor 1616 to programmable logic 1628 such as a microcontroller, state machine, PID controller, or other apparatus configured to drive an actuator 1630 configured to adjust the position of the first collector 1604 (and/or any second collector) responsive to the sensor signal or data. For example, a rate of liquid collection may be decreased or stopped by controlling a pump or valve 1632 if a boundary 1614 between the exclusion zone 1608 and bulk fluid containing suspended particles or solute approaches a location 1620 too close to a liquid intake 1622. Similarly, the distance (depth) of the collector 1602 may be set as a function of a detected location 1618 of the interface 1610 by actuating the position or configuration 1634 of the structure 1605.

The sensor 1616 may use one or more of a variety of technologies to sense conditions relevant to liquid collection by the collector 1604. For example, the sensor may be an optical sensor, an ultrasonic or sonic sensor, or an electrical sensor.

For example, an optical sensor 1616 can measure scattering caused by particles in the polar liquid 1606, 1608. Additionally or alternatively, an optical sensor 1616 can measure an absorption characteristic of a spectrum of a solute or suspension. Additionally or alternatively, an optical sensor 1616 can measure specular reflection off an air/liquid interface 1610, and given a characteristic exclusion zone 1608 thickness, one can infer the distance to the bottom 1614, 1620 of the exclusion zone. In systems where the polar liquid is water, the exclusion zone 1608 was found to strongly absorb 270 nanometer ultraviolet light. The sensor 1616 can thus measure 270 nanometer absorption (or another absorption spectrum characteristic of an exclusion zone 1608 of water or another polar liquid), and optionally one or more reference wavelengths, to determine or infer the presence or thickness of the exclusion zone 1608. Accordingly, one or more optical characteristics may be measured by the sensor 1616 and output used by the logic 1628 to drive the actuator 1630.

Similarly, electrical characteristics of the exclusion zone 1608 and bulk or component-enriched polar liquid 1606 beyond the border 1614 of the exclusion zone may differ. Conductivity or electrical potential may, for example, be sensed by the sensor 1616 at one or more various locations 1612, 1618, 1620, 1624, 1626, and output used by the logic 1628 to drive the actuator 1630. Alternatively a sonic or ultrasonic transmission or reflection characteristic may be measured by the sensor 1616 and output used by the logic 1628 to drive the actuator 1630.

The actuator 1630 may be configured to adjust a pump or valve 1632 configured to control a rate of removal of the fraction by the first collector 1604. According to an embodiment, adjustment of a pump or valve 1632 may be used to select between collection by a plurality of collectors 1604. Alternatively or additionally, the actuator 1630 may be configured to adjust a position 1634 in which the structure 1605 holds the collector 1604. The logic 1628 may receive the sensor signal or data and responsively drive the actuator to establish or maintain a desired collection fraction.

CONCLUSION

The foregoing discussion describes exemplary systems and methods for separating components of aqueous mixtures, suspensions, and solutions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for collecting a fraction of a polar liquid mixture, suspension, or solution, comprising:
   providing a hydrophilic surface;
   receiving, establishing, or accessing a volume of a polar liquid mixture, suspension, or solution in contact with the hydrophilic surface;
   allowing an exclusion zone to form adjacent to an interface between the polar liquid mixture, suspension, or solution and the hydrophilic surface; and
   collecting a fraction of the polar liquid mixture, suspension, or solution at a selected distance from the hydrophilic surface.

2. The method for collecting a fraction of the polar liquid mixture, suspension, or solution of claim 1, wherein collecting the fraction includes collecting the fraction at the interface or from within the exclusion zone.

3. The method for collecting a fraction of the polar liquid mixture, suspension, or solution of claim 2, wherein the collected fraction comprises substantially pure polar fluid.

4. The method for collecting a fraction of the polar liquid mixture, suspension, or solution of claim 1, wherein collecting the fraction includes collecting the fraction at a distance from the interface beyond the exclusion zone.

5. The method for collecting a fraction of the polar liquid mixture, suspension, or solution of claim 4, further comprising:
   collecting a second fraction at the interface or within the exclusion zone.

6. The method for collecting a fraction of the polar liquid mixture, suspension, or solution of claim 1, wherein the interface is between the polar liquid mixture, suspension, or solution and air.

7. The method for collecting a fraction of the polar liquid mixture, suspension, or solution of claim 1, wherein the interface is between the polar liquid mixture, suspension, or solution and the hydrophilic surface.

8. The method for collecting a fraction of the polar liquid mixture, suspension, or solution of claim 1, wherein the polar liquid is water.

9. The method for collecting a fraction of the polar liquid mixture, suspension, or solution of claim 1, further comprising:
   sensing one or more of a position of the interface, a size of the exclusion zone; or a concentration of a mixed component, suspended component, or a solute in the vicinity in the collected fraction.

10. The method for collecting a fraction of the polar liquid mixture, suspension, or solution of claim 9, further comprising adjusting the selected distance or adjusting a rate of collection responsive to sensing.

11. The method for collecting a fraction of the polar liquid mixture, suspension, or solution of claim 10, wherein adjusting the rate of collection includes stopping collection.

12. The method for collecting a fraction of the polar liquid mixture, suspension, or solution of claim 1, wherein receiving, establishing, or accessing a volume of a polar liquid mixture, suspension, or solution includes holding the volume of the polar liquid mixture, suspension, or solution in a vessel.

13. The method for collecting a fraction of the polar liquid mixture, suspension, or solution of claim 1, wherein the fraction is defined as a concentration of a mixed component, suspended component, or solute different from other concentrations of the mixed component, suspended component, or solute at different distances from the interface.

14. The method for collecting a fraction of the polar liquid mixture, suspension, or solution of claim 1, wherein the exclusion zone extends to a distance of about 2 mm from the interface.

15. The method for collecting a fraction of the polar liquid mixture, suspension, or solution of claim 1, wherein the volume of the polar liquid mixture, suspension, or solution is received, established, or accessed in a substantially continuous flow.

16. The method for collecting a fraction of the polar liquid mixture, suspension, or solution of claim 1, wherein the volume of the polar liquid mixture, suspension, or solution is received, established, or accessed in a batch.

* * * * *